(12) United States Patent
Krouse

(10) Patent No.: US 8,939,677 B2
(45) Date of Patent: Jan. 27, 2015

(54) MOVEABLE ELEMENT AND POWER GENERATION SYSTEM FOR LOW HEAD FACILITIES

(75) Inventor: Wayne F. Krouse, Mount Brook, AL (US)

(73) Assignee: Hydro Green Energy, LLC, Westmont, IL (US)

( * ) Notice: Subject to any disclaimer, the term of this patent is extended or adjusted under 35 U.S.C. 154(b) by 156 days.

(21) Appl. No.: 13/461,911

(22) Filed: May 2, 2012

(65) Prior Publication Data

US 2012/0282030 A1    Nov. 8, 2012

Related U.S. Application Data

(60) Provisional application No. 61/482,256, filed on May 4, 2011.

(51) Int. Cl.
*E02B 9/00* (2006.01)
*E02B 9/02* (2006.01)
*E02B 7/40* (2006.01)

(52) U.S. Cl.
CPC ............... *E02B 9/022* (2013.01); *Y02E 10/22* (2013.01); *E02B 7/40* (2013.01)
USPC ............................................. 405/100; 405/78

(58) Field of Classification Search
USPC .................. 405/75–78, 100, 107; 290/53, 54; 60/497
See application file for complete search history.

(56) References Cited

U.S. PATENT DOCUMENTS

| | | | | |
|---|---|---|---|---|
| 3,851,476 A | * | 12/1974 | Edwards | 405/25 |
| 4,377,352 A | * | 3/1983 | Goodstein | 405/115 |
| 4,843,249 A | * | 6/1989 | Bussiere | 290/53 |
| 6,623,209 B1 | * | 9/2003 | Waters, Jr. | 405/94 |
| 7,476,986 B1 | * | 1/2009 | Del Principe | 290/53 |
| 2002/0088222 A1 | * | 7/2002 | Vauthier | 60/398 |
| 2005/0121917 A1 | * | 6/2005 | Kikuchi | 290/53 |

* cited by examiner

*Primary Examiner* — Tara M. Pinnock

(57) ABSTRACT

A low head power generating system is disclosed including a wall pivotably attachable to a structure for moving between a generally upright position and a generally flat position. In the upright position, the structure or wall impounds water, and has a power generating cell connected to the wall, which rotates by movement of water there-through and is operably connectable to a generator for generating power. A support braces the wall in the upright position. The support is adjustable with a first end connected to the wall and a second end extended against a structure, and can be an inflatable bladder, a pressurized piston or other mechanism to move the wall. The cell can be mounted on the surface of the wall or integrated within the wall.

3 Claims, 3 Drawing Sheets

MOVEABLE ELEMENT AND POWER GENERATION SYSTEM FOR LOW HEAD FACILITIES

CROSS REFERENCE TO RELATED APPLICATIONS

This application claims priority to U.S. Provisional Patent Application No. 61/482,256 filed May 4, 2011, which is incorporated as if fully set forth herein.

BACKGROUND OF THE INVENTION

1. Field of the Invention

This invention relates to low head hydropower facilities, and more particularly to a moveable element and power generation system for low head facilities.

2. Description of Related Art

Of the approximately 80,000 dams in the United States, about 2,500 of them produce some electricity. There is, therefore, a large inventory of non-hydropower producing dams. At these dams, water is released either continuously, or on an intermittent to regular basis for, among other things, flood control or irrigation purposes. Usually, governments and municipalities do not want anything to interfere with releasing water from the dams or reservoirs, or interfere with water movement downstream. Accordingly, anything fixed in the flow path of the water that might interfere with downstream water movement is undesirable to them. Previous solutions to increasing gross head pressure, which increases the potential for power generation, have involved moveable walls or flashboards that are deployed on the top of an existing dam structure to increase the gross head on a temporary basis.

Wicket-type gates have been utilized for navigation dams for over 100 years. These gates are often considered for navigable dam spillways, but they also function as non-navigable spillways. The gates can be lifted into position with a hydraulic or pneumatic cylinder applying force to the downstream side or with a gearbox. The wickets are generally held in an up position with a prop or strut that slides in a track on the lower pool side of the wicket. This allows the cylinder piston to be retracted, or extended during operating cycles.

These systems, however, are not intended for power generation, but to increase the height of the blocked water in the upper pool, thereby creating a larger gross head pressure. In some cases, the top of the existing dam is raised by these temporary walls and existing turbines positioned at the base of the dam receive increased head pressure which results in higher power production than without the higher gross head. However, none of these systems allow for the situational use of hydropower in a deployable system that may be placed in virtually any environment where low head is available while at the same time having the ability to let water pass over the turbine powerhouse during flooding events so that the turbine powerhouse does not reduce the flow of flood waters on the dam or dam spillway. Nor do any of these systems allow for a variety of combinations of turbines and movable walls to create interchangeable power generating cells and enhancements.

BRIEF SUMMARY OF THE INVENTION

An advantage of the present invention is to provide a system for converting low head dams into hydropower facilities, while still allowing near maximum discharge during flood events of the dam.

Another advantage of the present invention is to provide a system for converting low head dams into hydropower facilities while providing minimal interference with water flow during floods.

A further advantage of the present invention is to use a wicket gate type dam with integrated and interchangeable cells to convert moving water to electricity, and a variety of mechanical methods to raise and lower moveable elements.

Another advantage of the present invention is to provide a system that uses a hydropower turbine attached to a movable element that increases available gross head pressure.

In accordance with a preferred embodiment of the present invention, there is shown a low head power generating system having a wall pivotably attachable to a structure for moving between a generally upright position and a generally flat position wherein the structure impounds water, and a power generating cell connected to the wall rotatable by movement of water there-through and operably connectable to a generator.

In accordance with another embodiment of the invention, there is shown a low head power generating system having a pivotable wall that pivots between an operable position and an inoperable position movably attached to the top of a structure that impounds water when in the operable position, a turbine disposed in the wall rotatable by the impounded water as it moves across the turbine wherein the turbine is operably connectable to a generator, and a supporting member for bracing the wall when in the operable position.

In accordance with another embodiment of the invention, there is shown a low head power generating system having a pivotable wall fixedly attachable to the top of a structure that pivots between a generally upright position and a generally flat position wherein the structure impounds water creating an upper pool side, a power generating cell operably connected to the wall through movement of water and operably connectable to a generator, and a supporting member for bracing the wall when in the upright position.

Other objects and advantages will become apparent from the following descriptions, taken in connection with the accompanying drawings, wherein, by way of illustration and example, embodiments of the present invention are disclosed.

BRIEF DESCRIPTION OF THE FIGURES

The novel features believed to be characteristic of the invention are set forth in the appended claims and claims yet to be filed. However, the invention itself, as well as a preferred mode of use and further objectives and advantages thereof, will best be understood by reference to the following detailed description when read in conjunction with the accompanying Figures wherein:

DETAILED DESCRIPTION OF THE PREFERRED EMBODIMENTS

Detailed descriptions of the preferred embodiments are provided herein. It is to be understood, however, that the present invention may be embodied in various forms. Various aspects of the invention may be inverted, or changed in reference to specific part shape and detail, part location, or part composition. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
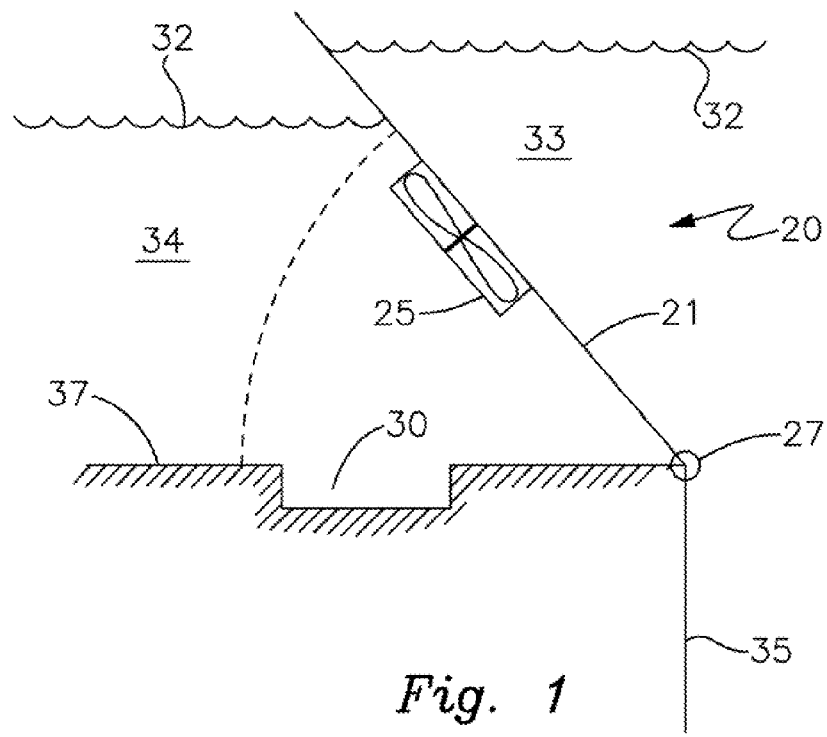
FIG. 1 is a side view schematic of a preferred embodiment of the present invention.

Turning first to FIG. 1, there is shown a wall 21 having an integrated, interchangeable turbine and generator combination 25 disposed in wall 21 to create a power generating cell 20. Cell 20 may be placed on the side of wall 21 or, in some embodiments, disposed completely flush into the wall. As illustrated more closely in the embodiment shown in FIGS. 1, 2 and 3, one end of wall 21 is connected to pivoting members 27 that permit wall 21 to be raised and lowered from approximately zero (0) degrees to approximately ninety (90) degrees. In some environments it may be preferable to raise wall 21 to more or less than ninety (90) degrees relative to the water surface of the upper pool 32. In the illustrated figures, water lever is depicted as 32. It will be appreciated that when wall 21 is raised, there exists an upper pool 33, shown to the right of wall 21 in the figures, and a lower pool 34, shown to the left in the figures. As can be appreciated, this is due to the natural direction of water flow and can be altered as the environment requires.

Figure 5:
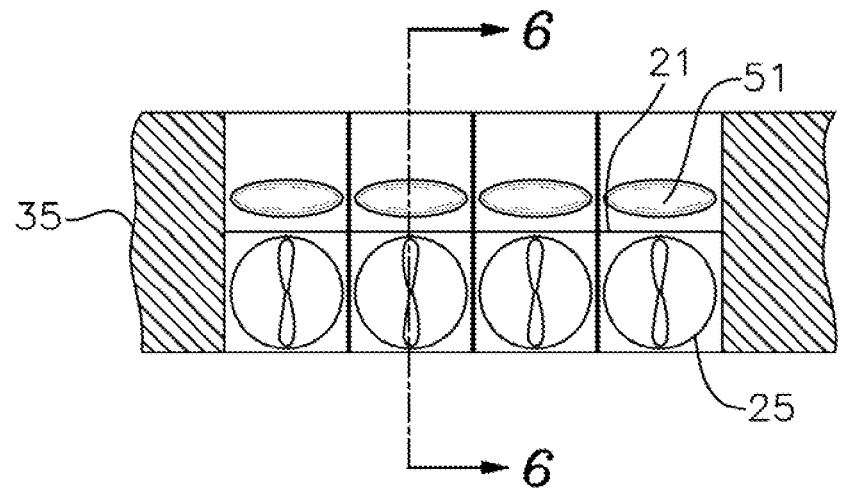
FIG. 5 is an elevational view of another preferred embodiment of the invention showing a group of modular turbines, inflatable bladders, and raisable walls.

As further illustrated in FIG. 1, the lower end of wall 21 may be pivotally attached to a structure such as the top of dam wall 35 already in place, or to the top of the cell as shown in FIG. 5. The existing dam structure creates a certain amount of head pressure, which may be enhanced by placement of a series of cells 20 and walls 21 according to the present invention along a line transverse to the flow in the body of water. In other settings with no existing dam, the walls of the present invention may be supported by structures at the bottom of the water channel and deployed as needed to create a low head dam.

In one embodiment as shown in FIG. 1, where cell 20 is placed on the surface of the wall, there may be a reciprocal depression 30 in the structure or on the bottom of the water channel 37 to receive cell 20 when in a down or non-generating position. In this way wall 21 is protected during floods and does not present any impediment to the flow of water.

As appreciated by those of skill in the art, cell 20 is positioned below water lever 32 in the lower pool 34, and thereby also below the water level 32 in the upper pool 33. The exact position of cell 20 below the water level in the lower pool can be modified according to the desired result.

As will also be appreciated, wall 21 is illustrated in a particular position in the figures, though wall 21 may be raised or lowered according to the particular environment employed. In addition, the water level 32 on either side of wall 21 is illustrated only to show the level above cell 20 and is not depicted in any specific level as is needed for the instant invention.

Figure 2:
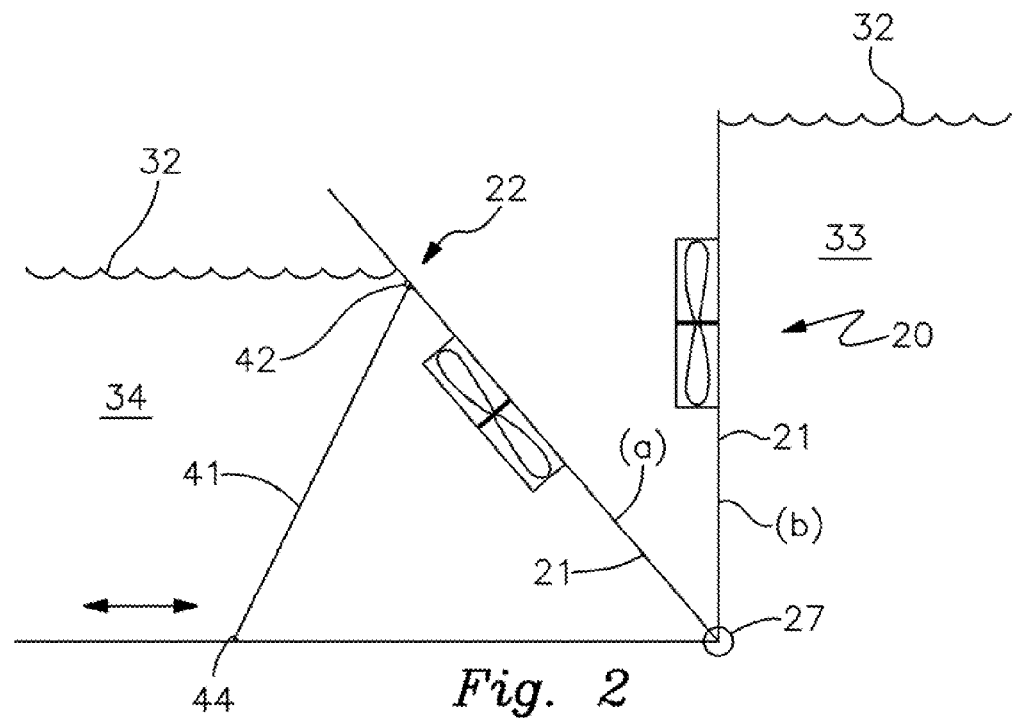
FIG. 2 is a side view schematic of another preferred embodiment of the present invention showing a knee brace and deployment of the invention.

FIG. 2 shows wall 21 on an embodiment of the present invention in two positions (a) and (b), along with knee brace 41 that may be employed to hold wall 21 in position while in the upright position, or any operable position between the zero (0) degree and ninety (90) degree position. First end 42 of knee brace 41 is connected to the upper portion 22 of wall 21 and second end 44 is moveably attached to the structure on the floor of the water channel 37 (shown in FIG. 1) or the dam structure to which it is attached, similar to the embodiment illustrated in FIG. 1. Second end 44 may be connected to a rolling member that permits the second end 44 to move between one position where the wall is flat to a second position where the wall is upright in any of a number of positions from zero (0) degrees to approximately ninety (90) degrees and is shown in FIG. 2 by the double-arrowed line, illustrating potential movement of second end 44 in both directions allowing movement of wall 21. Second end 44 may be fixedly attached on the structure or dam to maintain the force on knee brace 41, which in turn maintains wall 21 in a water blocking position. In the upright position (b) shown in FIG. 2, with knee brace 41 omitted for clarity, wall 21 creates a block, thus raising the level of water level 32 to create additional head pressure. This permits water to flow through cell 20, thus generating power.

Figure 3:
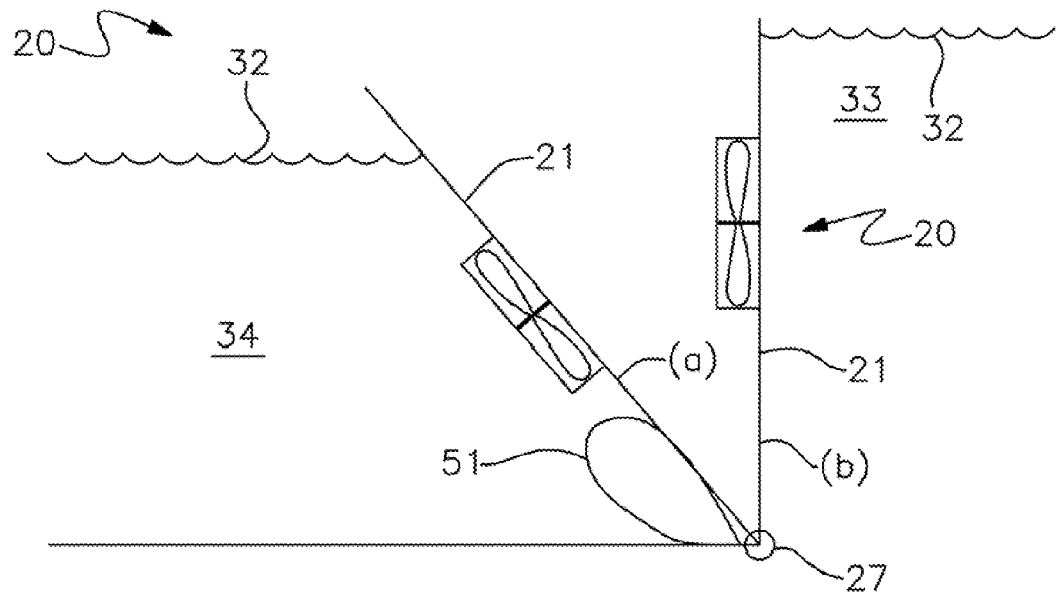
FIG. 3 is a side view schematic of another preferred embodiment of the present invention showing an inflatable bladder.

In an alternate embodiment as shown in FIG. 3, inflatable bladder 51 may be deployed on the downstream side of wall 21 to raise and lower wall 21 into an operable position, two potential positions of which are shown as (a) and (b). Bladder 51 may be filled with a pressurized fluid such as water or a hydraulic oil system, but may also include air, for increasing the size of the bladder and in turn raising and lowering wall 21 as desired. Similar to FIG. 2, wall 21 may be placed on the top of an existing dam or along the bottom surface of the body of water. Another embodiment includes having the wall 21 connected to the top of the cell 20 with the turbines connected to the existing dam as shown in FIG. 5. A series of such walls 21 may be employed to create a kind of moveable dam that creates a low head power generating station. The water that would otherwise be blocked by the wall flows through cells 20, thereby generating power.

Figure 4:
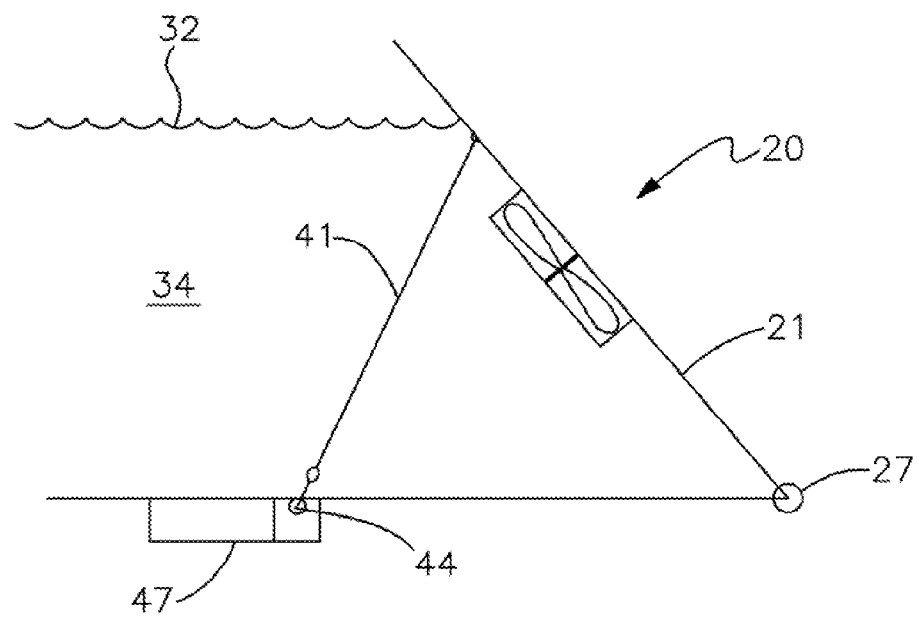
FIG. 4 is a side view schematic of another preferred embodiment of the Present invention showing a pressurized piston.

In another alternate embodiment shown in FIG. 4, second end 44 of knee brace 41 may be attached to a pressurized piston 47 that in turn raises and lowers wall 21 upon activation.

FIG. 5 shows a series of modular bladder raisable wall and turbine combinations that may be employed in an existing dam. Bladders are labeled 51, similar to those illustrated in FIG. 3, while turbine and generator combination are labeled 25 similar to those in FIG. 1. Also similar to FIG. 1, dam wall 35 is shown. Turbine and generator combinations 25 are positioned to receive head power from the existing dam, but have placed on top of them an additional head producing wall 21.

Figure 6:
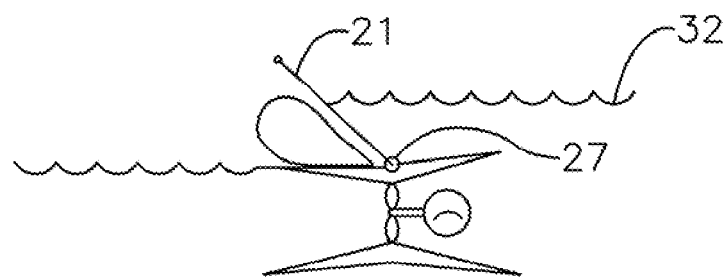
FIG. 6 is a side cross sectional view of FIG. 5 taken along line 6-6.

FIG. 6 shows a cross section view of FIG. 5 taken along line 6-6 and illustrates that wall 21 is raisable in this embodiment with bladder 51 as previously described to create additional head. The power generating cell depicted in FIGS. 5 and 6 may be preexisting within a dam structure or added to an existing dam.

Figure 7:
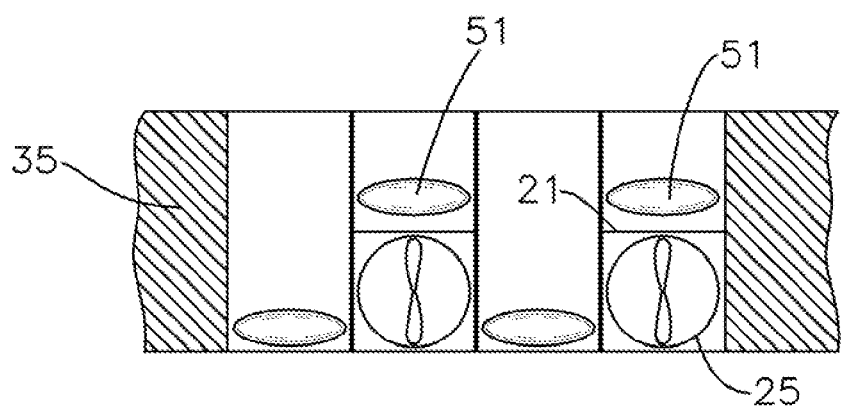
FIG. 7 is an elevational view of another preferred embodiment of the invention showing a series of moveable bladder raisable walls and modular turbine generator cells.

FIG. 7 shows a series of bladders 51 and walls 21 that may be moveable and placed in various positions with fixed turbine and generator combinations 25, or in combination with moveable turbine and generator cells depending on the circumstances. Any combination of power generating cell and raisable wall may be employed depending on the existing dam, the terrain, or flow characteristics of the body of water. As shown in FIG. 7, the inflatable bladder module may be inserted in different positions among the turbine generator cells. In alternative embodiments, the turbine and generator cells may also be moveable and configured with moveable walls to achieve the desired power from the body of water.

As noted above, the individual cells may be configured as part of the moveable wall as shown in FIGS. 1-4, and be designed for modular placement in or alongside an existing dam structure.

In any of these embodiments, the wall may be disposed on the bottom surface of the water body, on the top of a turbine cell or on the top of an existing dam structure for the purpose of creating additional head. The turbine and generator cell upon activation of the wall are thus engaged with sufficient gross head to turn the turbine and create power. By deploying a series of these walls across a body of water, power may be generated without interfering with the current flow of the body of water. Further, in the event of a flood or other need to clear the water channel of debris or ice, these walls may be lowered and placed in such a position as to not interfere with navigation or otherwise impede the flow of water.

While the invention has been described in connection with preferred embodiments, it is not intended to limit the scope of the invention to the particular forms set forth, but on the contrary, it is intended to cover such alternatives, modifications, and equivalents as may be included within the spirit and scope of the invention as defined by the appended claims, and claims that may issue.

The invention claimed is:

1. A power generating system comprising:
   a. a wall pivotably attachable to a structure for moving between a generally upright position and a generally flat position wherein said structure impounds water, said structure comprises a reciprocal depression for insertion of said wall when in the generally flat position; and
   b. a power generating cell connected to said wall rotatable by movement of water there-through and operably connectable to a generator.

2. A power generating system comprising:
   a. a pivotable wall fixedly attachable to the top of a structure that pivots between a generally upright position and a generally flat position wherein said structure impounds water creating an upper pool side;
   b. a power generating cell operably connected to said wall through movement of water and operably connectable to a generator said cell is fixedly connected to a trash rack on said upper pool side; and
   c. a supporting member for bracing said wall when in said upright position.

3. A power generating system comprising:
   a. a pivotable wall fixedly attachable to the top of a structure that pivots between a generally upright position and a generally flat position wherein said structure impounds water creating an upper pool side;
   b. a power generating cell operably connected to said wall through movement of water and operably connectable to a generator where said cell is attached to a movable trash rack on said upper pool side; and
   c. a supporting member for bracing said wall when in said upright position.

* * * * *